United States Patent [19]
Seino et al.

[11] Patent Number: 5,214,724
[45] Date of Patent: May 25, 1993

[54] OPTICAL WAVEGUIDE DEVICE WITH SUPPRESSED DC DRIFT

[75] Inventors: Minoru Seino, Atsugi; Naoyuki Mekada, Hadano; Tadao Nakazawa, Hiratsuka; Yoshinobu Kubota, Ayase; Masaharu Doi, Atsugi, all of Japan

[73] Assignee: Fujitsu Limited, Kawawsaki, Japan.

[21] Appl. No.: 661,602

[22] Filed: Feb. 28, 1991

[30] Foreign Application Priority Data

Mar. 2, 1990 [JP] Japan .................. 2-052022

[51] Int. Cl.⁵ .................................. G02B 6/10
[52] U.S. Cl. ................................. 385/2; 385/8
[58] Field of Search ............... 350/96.14, 96.15; 385/1, 2, 3, 16, 130, 141, 8

[56] References Cited

U.S. PATENT DOCUMENTS

| | | | |
|---|---|---|---|
| 4,679,893 | 7/1987 | Ramer | 385/16 X |
| 4,683,448 | 7/1987 | Duchet et al. | 350/96.14 X |
| 4,684,207 | 8/1987 | Lawless | 350/96.14 |
| 4,932,738 | 6/1990 | Haas et al. | 350/96.14 |
| 4,936,644 | 6/1990 | Raskin et al. | 350/96.14 |
| 5,002,353 | 3/1991 | Johnson | 350/96.14 |
| 5,013,114 | 5/1991 | Young | 350/96.14 |

FOREIGN PATENT DOCUMENTS

62-73207  4/1987  Japan .
62-173428 7/1987  Japan .

OTHER PUBLICATIONS

Yamada et al., "DC Drift Phenomena in LiNbO3 Optical Waveguide Devices", *Japanese Journal of Applied Physics*, vol. 20, No. 4, Apr. 1981, pp. 733-737.

Patent Abstracts of Japan, vol. 13, No. 517, Aug. 24, 1989, p. 962 for Japanese Application No. 1210928 (Fujitsu Ltd), Feb. 18, 1988.

Mikami et al., "Phase Tuning in Optical Directional Coupler", *Japanese Journal Of Applied Physics, Supplements*, vol. 16, No. 1, 1977, pp. 321-324.

Bulmer et al., "Pyroelectric Effects in LiNbO3 Channel-Waveguide Devices", *Applied Physics Letters*, vol. 48, No. 16, Apr. 1986, pp. 1036-1038.

Gee et al., "Minimizing DC Drift in LiNbO3 Waveguide Devices", *Applied Physics Letters*, vol. 47, No. 3, Aug. 1985, pp. 211-213.

Patent Abstracts of Japan, vol. 11, No. 274, Apr. 3, 1987, p. 612 for Japanese Application No. 62073207 (Fujitsu Ltd), Sep. 27, 1985.

*Primary Examiner*—John D. Lee
*Assistant Examiner*—Phan Thi Heartney
*Attorney, Agent, or Firm*—Staas & Halsey

[57] ABSTRACT

An optical waveguide device includes an optical waveguide formed on a surface of a substrate having an electrooptical effect, and a pair of electrodes formed on corresponding regions above the optical waveguide and receiving a driving electric signal thereacross. By applying the electric signal to the electrodes, an electric field is formed in a vicinity of the optical waveguide. By changing a distribution of the electric field in accordance with a change in a frequency of the electric signal, it is possible to suppress a DC drift of the device to effectively compensate a fluctuation in operational characteristics due to the DC drift, stress of the like.

13 Claims, 10 Drawing Sheets

OPTICAL WAVEGUIDE DEVICE WITH SUPPRESSED DC DRIFT

BACKGROUND OF THE INVENTION

1. Field of the Invention

The present invention relates to an optical waveguide device, more particularly, to an optical waveguide device such as modulators, switches, distributors, or the like, used in an optical communication apparatus.

2. Description of the Related Art

A typical optical waveguide device used in an optical switch, an optical modulator, or the like, is constituted such that electric field is applied to an optical waveguide formed on a surface of a substrate consisting of electrooptical crystal such as lithium niobate (LiNbO$_3$), or the like, so as to change a refractive index and thus switching or phase modulation of a light signal traveling through the optical waveguide can be carried out.

As an example of the optical waveguide device, a Mach-Zehnder type modulator is well known. A modulator of this type includes at least an optical waveguide formed on a surface of a Z-cut LiNbO$_3$ substrate and a pair of asymmetrical electrodes formed on corresponding regions above the optical waveguide. In such a structure, charges collected on the surface of the LiNbO$_3$ substrate by pyroelectric effect act on the asymmetrical structure of the electrodes and thus a disadvantage occurs in that a distribution of charges is made uneven and an adverse influence is exerted on characteristics of the device.

Also, since a distribution of resistance, dielectric constant and capacitance of each portion of the structure or partial fine structure is delicately changed in accordance with the process conditions, the electrical equivalent circuit accordingly becomes complicated. This results in a problem in that a direct current (DC) component of an electric signal applied across the electrodes greatly changes an application manner of the electric field with a long-term time constant and the optical response is also accordingly changed. This phenomenon is called a DC drift.

To cope with the problem, various measures have been heretofore taken. However, a satisfactory and effective technique of solving the problem has not yet been proposed.

Note, problems in the prior art will be explained in detail later in contrast with the preferred embodiments of the present invention.

SUMMARY OF THE INVENTION

An object of the present invention is to provide an optical waveguide device capable of suppressing a DC drift thereof to effectively compensate a fluctuation in operational characteristics due to the DC drift, stress, or the like.

According to the fundamental aspect of the present invention, there is provided an optical waveguide device including: an optical waveguide formed on a surface of a substrate having an electrooptical effect; and a pair of electrodes formed on corresponding regions above the optical waveguide and receiving a driving electric signal thereacross, wherein a distribution of electric field occurring in a vicinity of the optical waveguide by an application of the electric signal is greatly changed in accordance with a change in a frequency of the electric signal.

The optical waveguide device of the present invention is roughly classified into two aspects.

One aspect is an optical waveguide device in which a third electrode other than the pair of driving electrodes is provided on a region spaced with a predetermined distance from the pair of driving electrodes formed on corresponding regions above the optical waveguide. In this aspect, the third electrode may receive a DC or low frequency voltage, or may be grounded under predetermined layout conditions of each electrode. The present aspect is based on the principle described below.

In an optical waveguide device formed on an electrooptical crystal substrate having a pyroelectric effect, it is preferable that a semiconductive layer of, e.g., silicon (Si) is formed on a buffer layer so as to make uniform a distribution of charges occurring in the vicinity of the surface of the optical waveguide. In this case, in the structure having a narrow electrode for signal line and a wide electrode for grounding, a potential on the semiconductive (Si) region on the outside of the electrode for signal line (i.e., on the opposite side of the electrode for grounding) is uniformly made equal because the silicon (Si) layer acts as a conductor in a low frequency band. As a result, a drawback arises in that the electric field to be concentrated on the vicinity of the electrode for signal line is dispersed into the outside semiconductive (Si) region and thus it is not effectively applied to the optical waveguide.

To cope with this drawback, the above third electrode is provided on the outside of the electrode for signal line, i.e., on the opposite side of the electrode for grounding. By this structure, it is possible to cause a voltage drop in proportion to the distance between the electrode for signal line and the third electrode and thus concentrate the dispersed electric field on the vicinity of the electrode for signal line. Also, by suitably changing the thickness of the silicon (Si) layer between the electrode for signal line and the third electrode, it is possible to change a distribution of resistance therebetween to regulate a distribution of the voltage drop and thus concentrate the electric field more effectively. On the other hand, when a high frequency electric signal is applied to the pair of driving electrodes, charges in the silicon (Si) layer cannot follow a change in the high frequency electric signal and thus the semiconductive layer functions as a dielectric. Also, by disposing the third electrode on a region spaced from the electrode for signal line with a sufficient distance, it is possible to reduce an influence exerted on the characteristic impedance of the optical traveling wave electrode. Furthermore, by employing a semiconductive layer having a relatively low resistance in place of a conductor as the third electrode, it is possible to gain the same effect as above and further reduce the influence exerted on the characteristic impedance.

Although the above structure premises that the third electrode is grounded, the third electrode may receive a voltage signal. In this case, more effective advantages can be obtained. Namely, by applying a DC or low frequency voltage to the third electrode, it is possible to compensate a fluctuation in operational characteristics occurring due to a DC drift, mechanical stress, or the like. In this case, it is preferable that a semiconductive layer consisting of material having a relatively high resistance, e.g., silicon (Si), is formed close to the electrode for signal line. The semiconductive layer may receive a voltage directly from an external power source, or may receive the voltage via a conductive layer, which is formed on the semiconductive layer at a position spaced from the electrode for signal line with a sufficient distance such that its presence does not greatly affect a characteristic impedance of the optical traveling wave electrode. By applying the voltage directly or indirectly to the semiconductive layer, it is possible to change a refractive index of the optical waveguide beneath the electrode for signal line and thus compensate a fluctuation in operational characteristics. In this case, the semiconductive layer functions as a conductor with respect to a low frequency voltage and functions as a dielectric with respect to a high frequency voltage. Accordingly, the presence of the semiconductive layer has less influence on the characteristic impedance in the high frequency band of the applied voltage. Also, another semiconductive layer may be formed all over the buffer layer so as to improve temperature characteristics. In this case, by decreasing the thickness of the semiconductive layer in the vicinity of the electrode for signal and concentrating the electric field on the thinly formed portion, it is possible to realize the same effect as above.

On the other hand, another aspect of the present invention is an improvement of a conventional Mach-Zehnder type optical waveguide device, in which the above-mentioned third electrode is not provided. The present aspect is based on the principle described below.

Electrodes constituting optical modulators, optical switches, or the like, are formed to have a possible low resistance and thus enable a high speed operation. To this end, it is preferable to use a material having a high electric conductivity such as copper (Cu), gold (Au), or the like, and increase the thickness of the electrode. Where a material having a relatively high resistance such as a silicon (Si) layer is adjacent to the material having a high electric conductivity, it functions in different phases in accordance with the selection of the resistance value. Namely, when a DC or low frequency voltage is applied to the electrode for signal line, the silicon (Si) layer is kept in a state of equal potential in the same manner as the conductor (electrode). Contrary to this, where the frequency of the signal propagating on the electrode for signal line is gradually increased, chargers in the silicon (Si) region cannot follow a high speed change in the signal, and thus, a region in which charges can follow the high speed change in the signal is gradually limited to the vicinity of the conductor (electrode). In other words, an effective shape of the electrode is greatly changed between the low frequency band and the high frequency band. By utilizing the change in the effective shape of the electrode, it is possible to constitute a device having various functions.

To realize a high speed switching or modulation, a pair of electrodes for a traveling wave are normally employed. According to an improved structure, a semiconductive layer comprised of silicon (Si) is formed between the pair of electrodes and the buffer layer. The semiconductive layer is separated into two regions in the center of the corresponding region thereof between the electrode for signal line and the electrode for grounding. By this constitution, an electric field by a DC or low frequency component of the applied signal is concentrated on the separated portion and a component of the electric field in the vicinity of the optical waveguide is weakened. Accordingly, even if the DC or low frequency component is changed due to a DC drift, it is possible to suppress a fluctuation in operational characteristics. On the other hand, where a high frequency electric signal is applied to the pair of electrodes, charges in the silicon (Si) layer cannot follow a change in the high frequency electric signal and thus the silicon layer functions as a dielectric. In this case, since the electric field is applied across the pair of electrodes, it effectively acts on the optical waveguide.

Also, even in the case that a thinly formed conductive layer is substituted for the above-mentioned semiconductive layer, it is possible to realize the same effect as above. This is because even the conductor has a larger volume resistivity than zero and the resistance value is increased with a decrease in the thickness of the conductive layer.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

For a better understanding of the preferred embodiments of the present invention, the problems in the prior art will be explained with reference to FIGS. 1A and 1B.

Figure 1A:
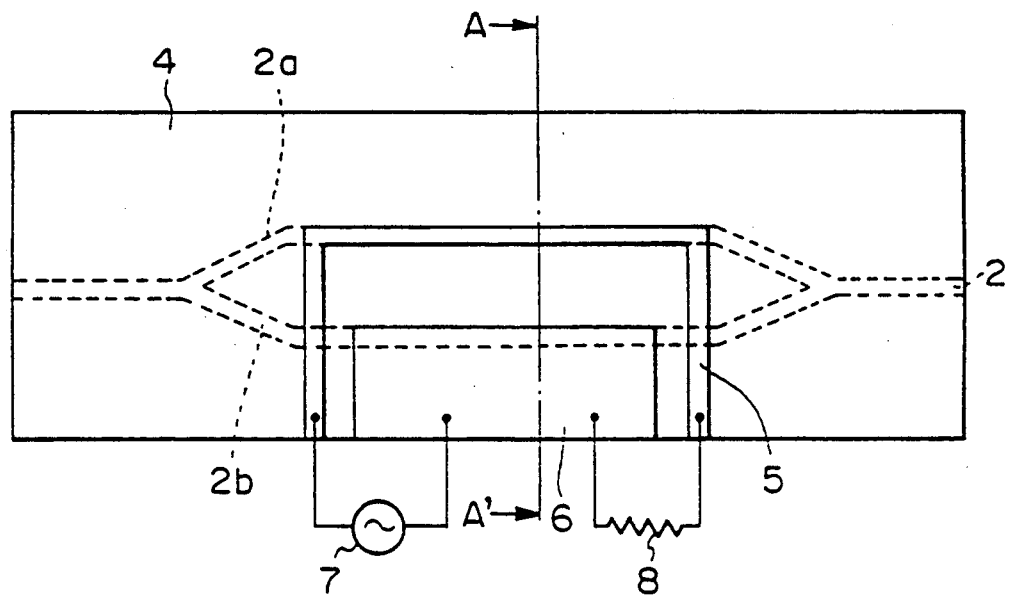
FIGS. 1A and 1B are plan view and sectional view, respectively, showing a structure of a prior art Mach-Zehnder type modulator.
Figure 1B:
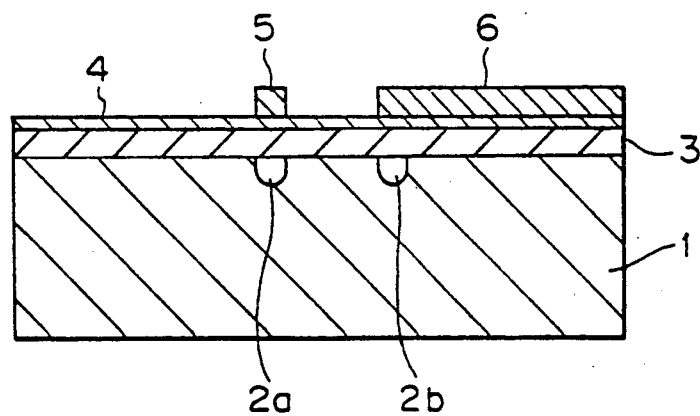

FIGS. 1A and 1B show a structure of a prior art Mach-Zehnder type modulator. Note, FIG. 1B shows a sectional structure along the line A—A' in FIG. 1A.

The illustrated structure shows an example using asymmetrical electrodes for a traveling wave.

In the drawings, reference 1 denotes a Z-cut LiNbO$_3$ substrate and reference 2 denotes an optical waveguide including two-forked optical waveguides 2a and 2b. The optical waveguide 2 (2a,2b) is formed by effecting a striplike patterning of a Titanium (Ti)-deposited layer formed on a surface of the substrate 1 and then effecting a thermal diffusion of the Titanium into the substrate 1. Thus, the optical waveguide 2 (2a,2b) has a larger refractive index than that of the substrate 1.

Also, to prevent a light propagating through the optical waveguide from being absorbed in driving electrodes (an electrode 5 for signal line and an electrode 6 for grounding), a dielectric buffer layer 3 is formed between the electrodes 5, 6 and the optical waveguide 2. The buffer layer 3 is translucent and has a smaller refractive index than that of the optical waveguide 2. The buffer layer 3 is comprised of, for example, silicon dioxide (SiO$_2$). The dielectric layer 3 electrically functions as a capacitance containing relatively high resistance material.

Also, in an optical waveguide device using a substrate of Z-cut LiNbO$_3$, a disadvantage occurs in that charges collected on the surface of the substrate by pyroelectric effect act on the asymmetrical structure of the electrodes formed on the buffer layer and thus an uneven distribution of charges is formed to have an adverse influence on characteristics of the optical waveguide device. In view of this, a semiconductive layer 4 comprised of, for example, silicon (Si), is formed between the buffer layer 3 and the electrodes 5, 6 and all over the buffer layer 3 (see FIG. 1B). By this structure, it is possible to make uniform the distribution of surface charges occurring due to a change in temperature or the like and stabilize the characteristics of the optical waveguide device.

Furthermore, since the optical waveguide 2 is formed by diffusing the Titanium with high temperature into the LiNbO$_3$ substrate 1, its resistance, dielectric constant and capacitance are different from those of the bulk portion of the substrate 1. Additionally, a resistance of the surface of the LiNbO$_3$ substrate 1 is different from that of the bulk portion thereof due to the diffusing process. By the complicated distribution of the resistance, dielectric constant and capacitance of the above layers and partial fine structure, the electrical equivalent circuit also becomes complicated. As a result, a problem occurs in that a DC component of an electric signal applied across the electrodes 5, 6 greatly changes an application manner of the electric field with a long-term time constant in accordance with the process conditions and the optical response characteristics is also accordingly changed. Namely, a DC drift is caused.

To cope with the problem, there has been taken measures to connect the electrodes 5, 6 of the modulator to an external power source by way of capacitance coupling and thus prevent a DC component of the power source from being directly applied to the modulator, or measures to connect a biasing DC power source to the electrode for signal line 5 by means of capacitance coupling and thus compensate a DC drift occurring due to some causes.

According to the measures to employ an external power source by way of capacitance coupling, however, a drawback occurs in that the device is brought to an electrically open state seen from the power source and thus an adverse influence is exerted on the operation of the power source. A disadvantage also occurs in that an available frequency band of the power source is limited in dependence on the capacity thereof. On the other hand, according to the measures to employ a biasing DC power source by way of capacitance coupling, a drawback occurs in that a characteristic impedance of the traveling wave electrode for signal line fluctuates and thus it is impossible to satisfactorily carry out the modulation operation.

Also, where a stress is applied to the optical waveguides for some causes, the refractive index of the optical waveguides is normally changed resulting in a fluctuation in operational characteristics of the modulator. To cope with the disadvantage, there has been heretofore taken measures to add a DC voltage to the application voltage so as to cancel a change in the refractive index occurring due to the stress.

However, to take the measures to add a DC voltage to the application voltage is often difficult from a viewpoint of the limit of the dielectric strength of the DC power source.

In view of the above problems, a structure or means other than the electrodes provided for switching or modulation needs to be provided for suppressing a DC drift and compensating a fluctuation in operational characteristics due to the DC drift, stress, or the like.

Next, preferred embodiments of the present invention will be explained with reference to FIGS. 2A to 13.

Figure 2A:
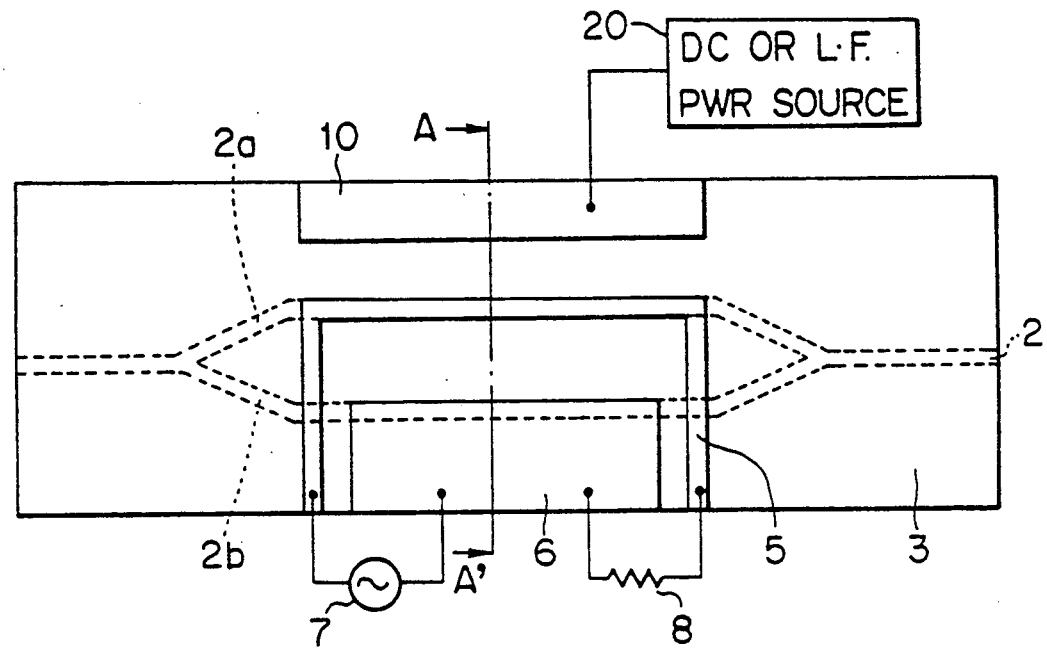
FIGS. 2A and 2B are plan view and sectional view respectively, showing a structure of the optical waveguide device (optical modulator) according to an embodiment of the present invention.
Figure 2B:
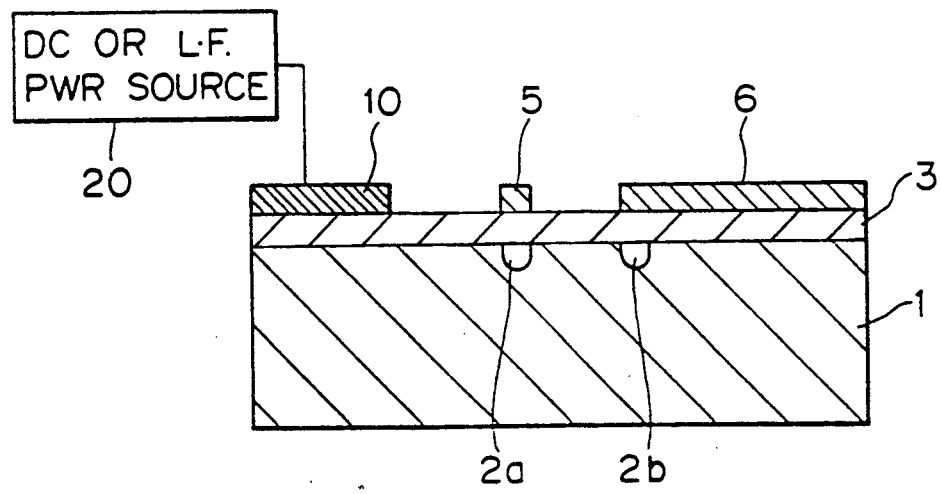

FIGS. 2A and 2B show a structure of the optical modulator according to an embodiment of the present invention.

In the illustration, reference 1 denotes a substrate consisting of lithium niobate (LiNbO$_3$), i.e., a Z-cut LiNbO$_3$ substrate. On the surface of the substrate 1, a striplike optical waveguide 2 having a width of approximately 7 μm is formed. The optical waveguide 2 includes two forked optical waveguides 2a and 2b, which are formed such that the forking angle is 1° and the distance therebetween is 15 μm. The optical waveguide 2 (2a,2b) is formed by effecting a patterning of a Titanium (Ti)-deposited layer formed on the surface of the substrate 1 and then giving a heating of 10 hours with a temperature of 1050° C. to effect a thermal diffusion of the Titanium into the substrate 1. Reference 3 denotes a buffer layer 3, which is formed all over the substrate 1 including the optical waveguide 2 (2a,2b). The buffer layer 3 is comprised of silicon dioxide (SiO$_2$) and has a thickness of approximately 0.6 μm.

Reference 5 denotes an electrode for signal line having a width of 7 μm and a thickness of approximately 10 μm, and reference 6 denotes an electrode for grounding having a thickness of approximately 10 μm. The electrodes 5 and 6 are comprised of gold (Au) and formed by plating on corresponding regions (buffer layer 3) above the optical waveguides 2a and 2b, respectively. The electrode for grounding 6 is formed so as to be surrounded by the electrode for signal line 5. Also, reference 7 denotes a source for applying a driving electric signal across the electrodes 5 and 6, and reference 8 denotes a terminal resistor connected between the electrodes 5 and 6.

Reference 10 denotes a third electrode having a thickness of approximately 10 μm and comprised of gold (Au). The third electrode 10 is formed by plating on the outside of the electrode for signal line 5, i.e., on the opposite side of the electrode for grounding 6, and receives a DC or low frequency voltage fed from a power source 20. In the present example, the third electrode 10 is disposed on a region (buffer layer 3) spaced with a distance of approximately 50 μm from the electrode for signal line 5. By this constitution, it is possible to decrease the influence exerted on the characteristic impedance of the optical waveguide 2 (2a,2b). Namely, by applying a DC voltage or a low frequency voltage below 5 to 6 kHz to the electrode 10, it is possible to change a refractive index of the optical waveguide 2a beneath the electrode for signal line 5. Note, the power source 20 is independent from the electric signal source 7 and thus the mutual interference is not substantially present. Therefore, it is possible to easily compensate a fluctuation in operational characteristics due to a DC drift, stress, or the like, by application of the DC or low frequency voltage to the electrode 10.

Figure 3A:
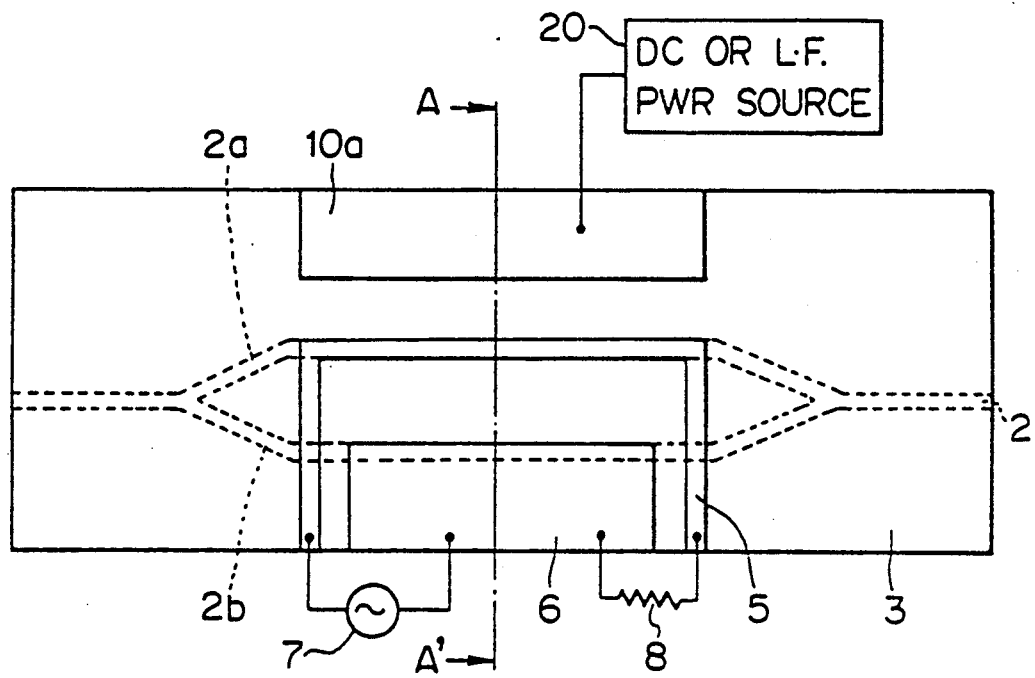
FIGS. 3A and 3B are plan view and sectional view, respectively, showing a first modification of the embodiment shown in FIGS. 2A and 2B.
Figure 3B:
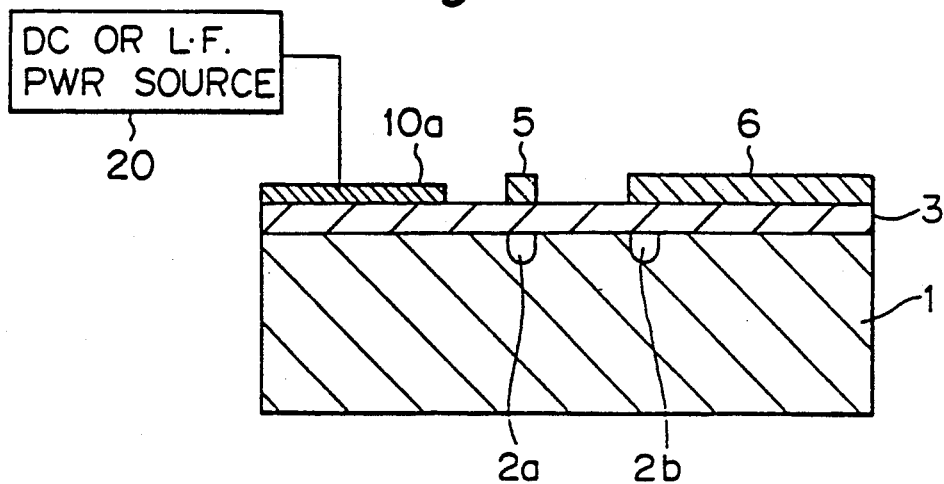

FIGS. 3A and 3B show a structure of a first modification of the embodiment shown in FIGS. 2A and 2B.

In the present example, an electrode 10a comprised of a semiconductive layer of silicon (Si) is provided in place of the metal electrode 10 shown in FIGS. 2A and 2B. The semiconductive electrode 10a is disposed on a region (buffer layer 3) spaced with a distance of approximately 15 μm from the electrode for signal line 5. In this case, by selecting a specific resistance of the semiconductive electrode 10a to be 100 Ωm and a thickness thereof to be 0.2 μm, the electrode 10a can function as a conductor or a dielectric. Namely, when the electrode 10a receives a DC voltage or a low frequency voltage below 500 to 600 Hz, it functions as an ordinary metal electrode. On the other hand, when the electrode 10a receives a high frequency voltage above 5 to 6 MHz, it rather functions as a dielectric because its equivalent resistance becomes relatively high and thus charges cannot follow a change in the electric field.

In this case, the presence of the semiconductive electrode 10a does not substantially have an influence on the characteristic impedance of the optical waveguide 2 (2a,2b). Also, since the semiconductive electrode 10a is disposed fully close to the electrode for signal line 5, it is possible to effectively change the refractive index of the optical waveguide 2a beneath the electrode for signal line 5. Therefore, it is possible to more effectively compensate a fluctuation in operational characteristics due to the DC drift, stress, or the like, by application of the DC or low frequency voltage to the electrode 10a.

Additionally, the device of FIGS. 3A and 3B is produced according to the process conditions below.

First, Titanium (Ti) is deposited on the Z-cut LiNbO₃ substrate 1 to have a thickness of approximately 90 nm and, using a photoresist, a waveguide pattern is formed on the Ti-deposited layer. The formed pattern acts as a mask. Then, a chemical etching is carried out to form a metal (Ti) pattern. The metal (Ti) pattern has a width of approximately 7 μm and includes a forked waveguide portion having a forking angle of 1° and a parallel waveguide portion having a length of 20 mm and spaced with a distance of 15 μm from each other. Then, the metal (Ti) pattern is diffused into the substrate 1 with a heat of 1050° C. and a time of 10 hours in a wet O₂ atmosphere, so as to form a single mode optical waveguide 2 (2a,2b) having an optical wavelength of 1.5 μm.

Next, the buffer layer (SiO₂) 3 having a thickness of 0.6 μm is formed by depositing on the substrate 1 including the optical waveguide. Then, the semiconductive layer (Si) 10a having a thickness of 0.1 μm and a length of 20 mm is formed by sputtering on a region (buffer layer 3) spaced with a distance of 15 μm from the optical waveguide 2a. The semiconductive layer (Si) 10a has a specific resistance of approximately 10 kΩ·cm.

Finally, the electrodes 5 and 6 comprised of gold (Au) and having a length of 20 mm and a thickness of 10 μm are formed by plating on corresponding regions (buffer layer 3) above the optical waveguide 2a, 2b. The metal (Au) electrodes 5 and 6 are spaced with a distance of 15 μm from each other and constitute asymmetrical electrodes for a traveling wave. Note, the electrode for signal line 5 has a width of 7 μm.

The operational voltage of the formed modulator is 5 V and the characteristic impedance of the electrodes for a traveling wave is 50 Ω. The value of the characteristic impedance is equal to that in the case that the semiconductive layer (Si) 10a is not provided. This means that the presence of the semiconductive layer does not have an influence on the characteristic impedance. Also, when the phase control corresponding to the operational voltage is carried out by means of the power source 20, a voltage of the power source 20 is 6 V and a frequency thereof is 10 Hz. These values are the same as those in FIGS. 2A and 2B in which the metal electrode 10 is provided in place of the semiconductive electrode 10a. Note, the characteristic impedance of the electrodes for a traveling wave employed in FIGS. 2A and 2B is 36 Ω.

Figure 4A:
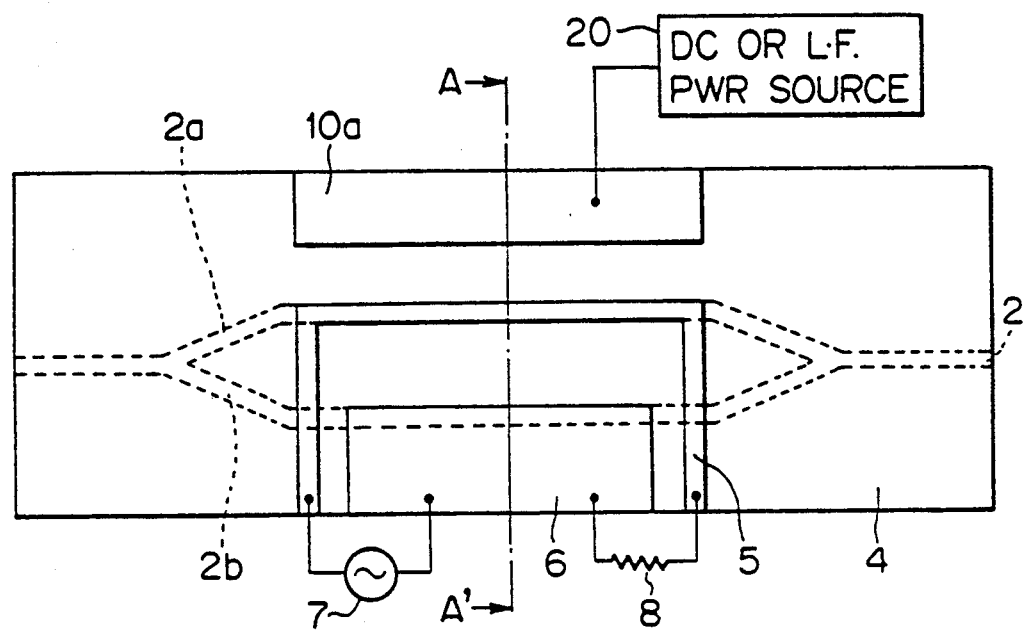
FIGS. 4A and 4B are plan view and sectional view, respectively, showing a second modification of the embodiment shown in FIGS. 2A and 2B.
Figure 4B:
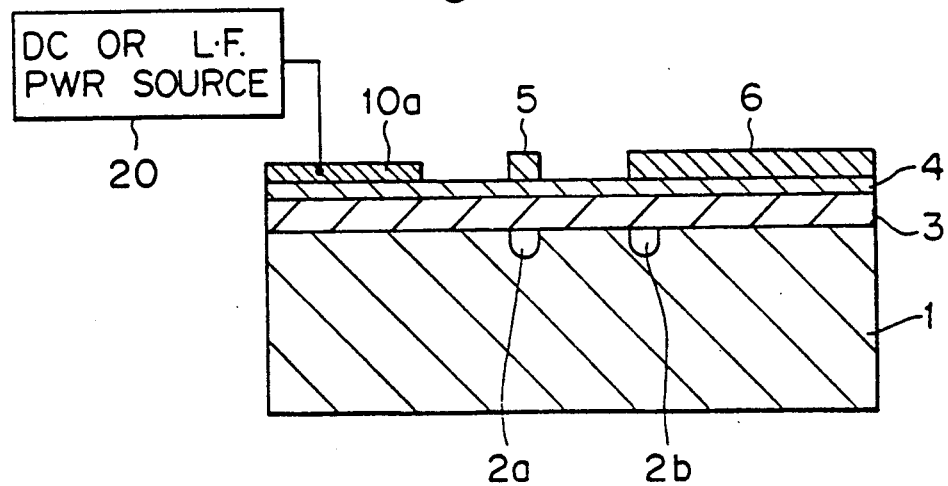

FIGS. 4A and 4B show a structure of a second modification.

In the present example, a semiconductive layer 4 comprised of silicon (Si) is added to the structure shown in FIGS. 3A and 3B. The semiconductive layer 4 has a thickness of 0.1 to 0.2 μm and is formed between the buffer layer 3 and the electrodes 5, 6 and 10a and all over the buffer layer 3. In this case, by selecting a specific resistance of the semiconductive electrode 10a to be two figures smaller than that of the semiconductive layer 4, it is possible to concentrate an electric field generated by a voltage applied to the electrode 10a on the region between the electrodes 10a and 5. As a result, it is possible to effectively change the refractive index of the optical waveguide 2a beneath the electrode for signal line 5. Although the thickness of the semiconductive layer 4 is selected to be constant, it is not restrictive. For example, by partially changing the thickness of the semiconductive layer 4 and decreasing the thickness of the layer 4 at a desired portion on which an electric field should be concentrated, it is possible to realize the same effect as above.

Figure 5A:
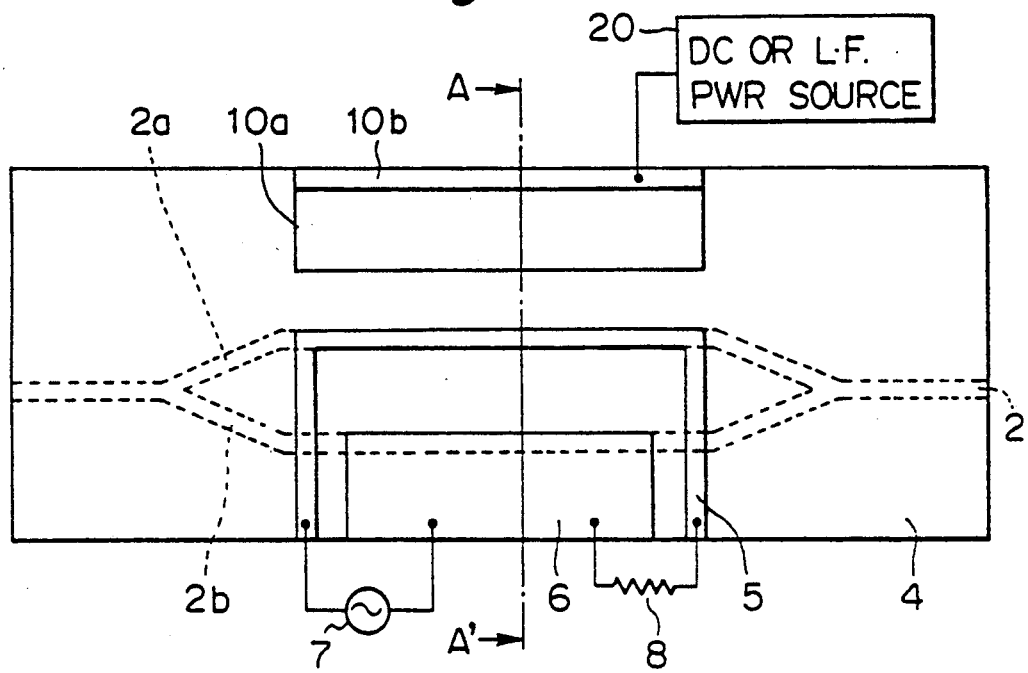
FIGS. 5A and 5B are plan view and sectional view, respectively, showing a third modification of the embodiment shown in FIGS. 2A and 2B.
Figure 5B:
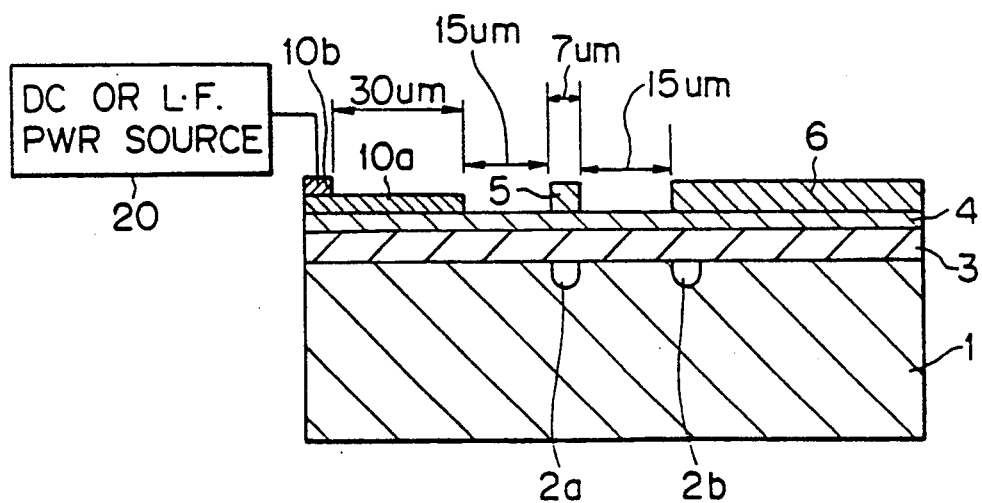

FIGS. 5A and 5B show a structure of a third modification.

In the present example, an electrode 10b comprised of gold (Au) is added to the structure shown in FIGS. 4A and 4B. In this case, the DC or low frequency voltage fed from the power source 20 is applied via the metal electrode 10b to the semiconductive layer 10a.

In the structure shown in FIGS. 5A and 5B, the semiconductive layer (Si) 4 having a thickness of 0.1 μm is uniformly formed by sputtering on the buffer layer (SiO₂) 3 having a thickness of 0.5 μm. Then, the semiconductive layer 10a having a thickness of 0.4 μm and a length of 20 mm is formed by sputtering on a region (semiconductive layer 4) spaced with a distance of 15 μm from the electrode for signal line 5. At this time, the patterning is carried out by a lift-off processing using a resist. Then, the asymmetrical electrodes 5, 6 for a traveling wave are formed by the same process as in FIGS.

3A and 3B and, furthermore, the metal electrode 10b having a length of 20 mm is formed by plating on a region (semiconductive layer 10a) spaced with a distance of 45 μm from the electrode for signal line 5.

The operational voltage of the formed modulator is 5 V and the characteristic impedance of the electrodes for a traveling wave 5, 6 is 45 Ω. In this constitution, when the phase control corresponding to the operational voltage is carried out by means of the power source 20, a voltage of the power source 20 is 7.2 V. Also, by the provision of the semiconductive layer 4, it is possible to suppress a fluctuation in operational points occurring due to a change in ambient temperature to below ±0.2 V.

Figure 6A:
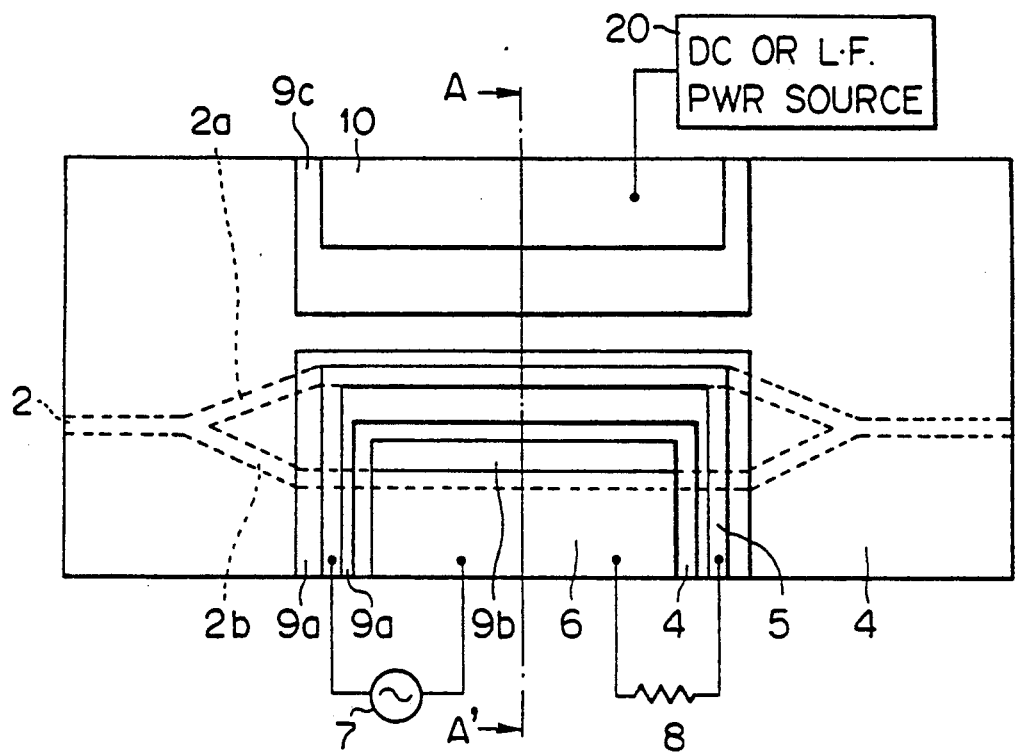
FIGS. 6A and 6B are plan view and sectional view, respectively, showing a fourth modification of the embodiment shown in FIGS. 2A and 2B.
Figure 6B:
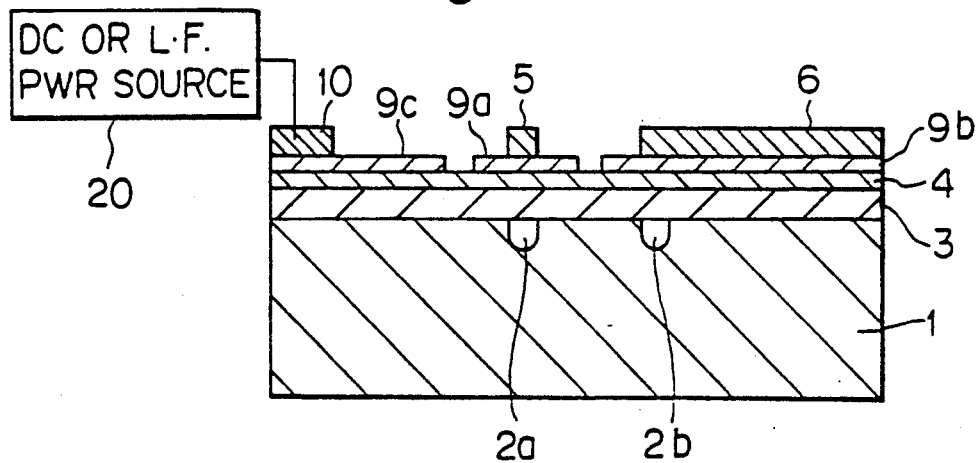

FIGS. 6A and 6B show a structure of a fourth modification.

In the present example, the semiconductive layer 4 and three semiconductive layers 9a, 9b and 9c each comprised of silicon (Si) are added to the structure shown in FIGS. 2A and 2B. The semiconductive layer 4 is formed all over the buffer layer 3 to stabilize the operational characteristics of the device with respect to a change in temperature. Also, the semiconductive layers 9a, 9b and 9c are formed between the semiconductive layer 4 and the electrodes 5, 6 and 10, respectively, and separated from each other in corresponding regions between each electrode. Each of the semiconductive layers 9a, 9b and 9c has a specific resistance different from that of the semiconductive layer 4 and has broader width than that of the corresponding electrode. According to this structure, it is possible to suppress a DC drift of the device and thus effectively compensate a fluctuation in operational characteristics due to the DC drift, stress, or the like.

Figure 7A:
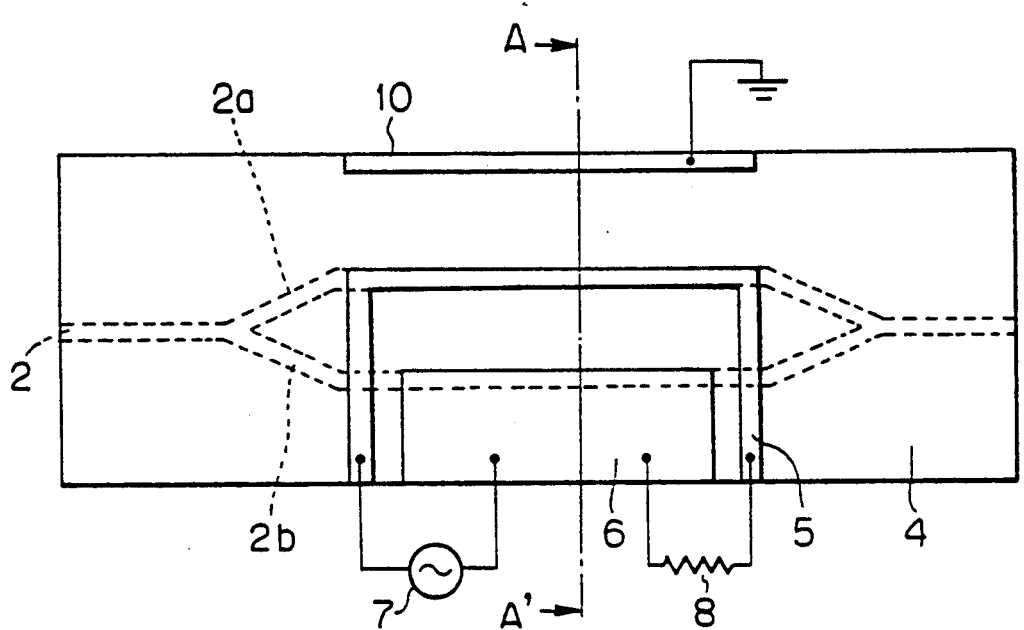
FIGS. 7A and 7B are plan view and sectional view, respectively, showing a structure of the optical waveguide device (optical modulator) according to another embodiment of the present invention.
Figure 7B:
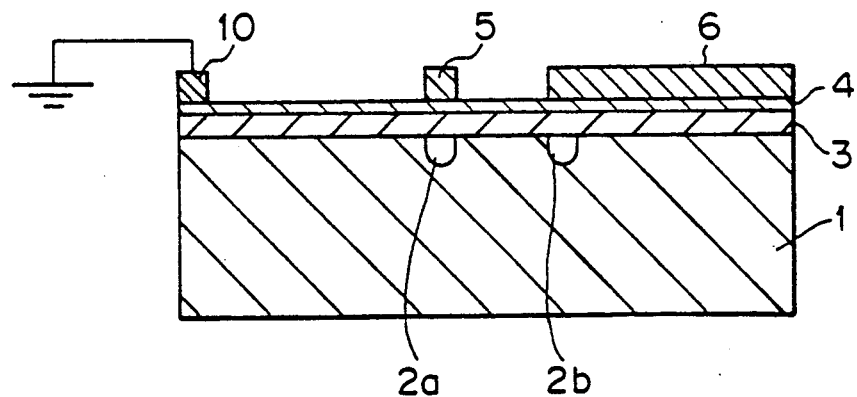

FIGS. 7A and 7B show a structure of the optical modulator according to another embodiment of the present invention.

The illustrated structure is intended to prevent a deterioration in modulation characteristics caused by the semiconductive (Si) layer 4 provided for an improvement in temperature characteristics of the device formed on the LiNbO₃ substrate. The feature and effect caused thereby are explained below in contrast with the prior art modulator shown in FIGS. 1A and 1B.

Referring to FIGS. 1A and 1B, when a DC voltage is applied between the electrodes 5 and 6, a voltage drop is caused linearly between the electrodes after a lapse of considerable long time. Accordingly, a potential on the semiconductive region 4 on the outside of the electrode for signal line 5 (i.e., on the opposite side of the electrode for grounding 6) is brought to be equal to that on the electrode for signal line 5. As a result, the lines of electric force caused by the voltage applied between the electrodes 5 and 6 are not concentrated on the vicinity of the electrode 5, but are dispersed into the semiconductive region 4 on the outside of the electrode 5. Therefore, it is impossible to effective change the refractive index of the optical waveguide 2a beneath the electrode 5.

To cope with the disadvantage, the third electrode 10 is provided on the outside of the electrode for signal line 5 (see FIGS. 7A and 7B). In this case, the third electrode 10 is grounded and disposed on a region spaced from the electrode 5 with a sufficient distance such that its presence does not substantially affect the characteristic impedance of the electrode 5. By this structure, a voltage drop is caused linearly between the electrodes 5 and 10 and thus the lines of electric force are concentrated on the vicinity of the electrode 5.

Although the thickness of the semiconductive layer 4 is selected to be constant, it is not restrictive. For example, by changing the thickness of the semiconductive layer 4 between the electrodes 5 and 10 and decreasing the thickness of the layer 4 in the vicinity of the electrode 5, it is possible to concentrate the voltage drop on the thinly formed portion and more effectively concentrate the lines of electric force on the vicinity of the electrode 5.

Figure 8A:
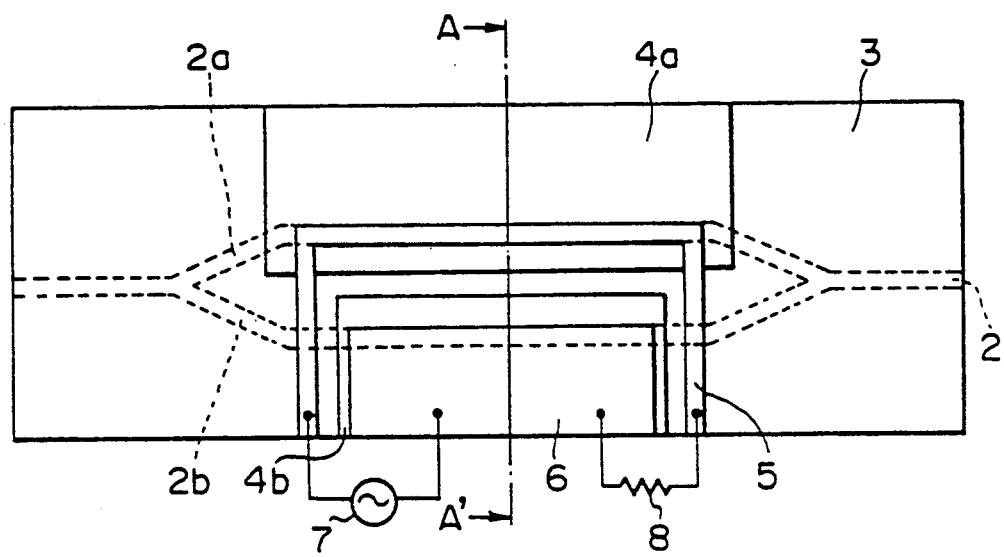
FIGS. 8A and 8B are plan view and sectional view, respectively, showing a structure of the optical waveguide device (optical modulator) according to still another embodiment of the present invention.
Figure 8B:
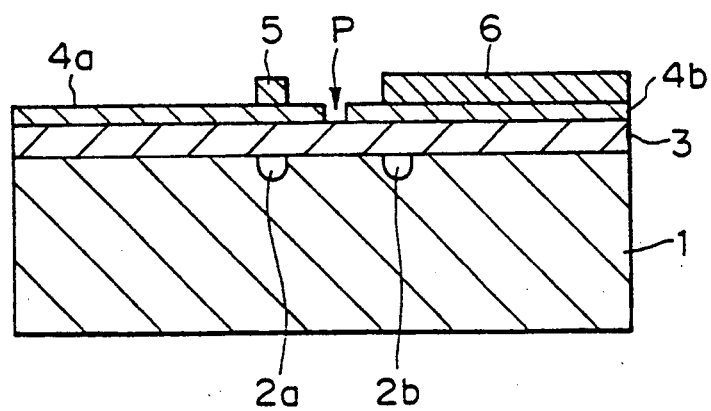

FIGS. 8A and 8B show a structure of the optical modulator according to still another embodiment of the present invention.

The illustrated structure is characterized by a semiconductive layer (4a, 4b) formed between the buffer layer 3 and the electrodes 5 and 6. The semiconductive layer is comprised of silicon (Si) and has a thickness of approximately 0.2 82 m, and is separated into two regions 4a and 4b in the center of the corresponding region thereof between the electrodes 5 and 6. The gap of the separated portion, indicated by reference P, is selected to be 1 to 4 μm. Note, each semiconductive layer 4a, 4b has a broader width than that of the corresponding electrode 5, 6. In this case, a specific resistance of the semiconductive layer (4a, 4b) can be designed and selected over a wide range of 0.001 to 100000 Ωm. Where the present optical modulator is used in a frequency of 5 to 6 MHz or more, the specific resistance is preferably selected to be 100 Ωm. Of course, the specific resistance is altered in accordance with a thickness of each layer, a layer-to-layer distance, a distance between each electrode, and the like.

By adopting the above structure, components of a DC voltage or a low frequency voltage of 50 to 60 Hz applied across the electrodes 5, 6 are concentrated on the separated portion P and thus do not substantially affect the characteristic impedance of the optical waveguide 2 (2a, 2b). On the other hand, where a high frequency voltage of approximately 5 to 6 MHz is applied across the electrodes 5, 6, charges cannot easily follow a change in the voltage and thus the semiconductive layer (4a, 4b) functions as a dielectric. Namely, since the high frequency voltage is applied between the electrodes 5 and 6, it is possible to effectively change the refractive index of the optical waveguide 2 (2a, 2b). Therefore, according to the present example, it is possible to disregard a DC component of the applied voltage and thus suppress an influence by the DC drift.

Figure 9:
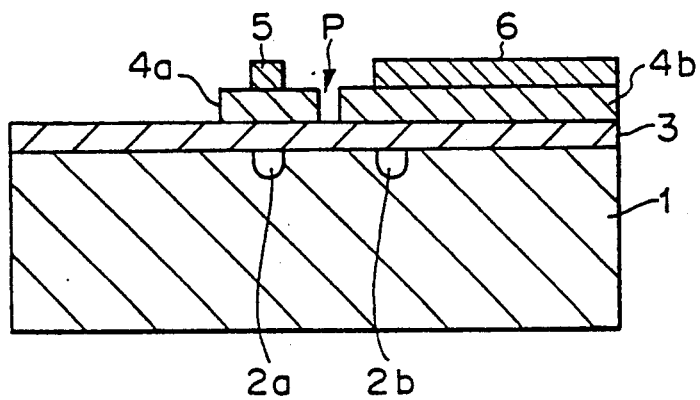
FIG. 9 is a sectional view showing a first modification of the embodiment shown in FIGS. 8A and 8B.

FIG. 9 shows a first modification of the embodiment shown in FIGS. 8A and 8B.

In the present example, the semiconductive layer 4a is formed only in the vicinity of the electrode for signal line 5. Since the width of the semiconductive layer 4a formed under the electrode 5 can be arbitrarily designed and selected, it is possible to realize a better frequency characteristics.

Figure 10:
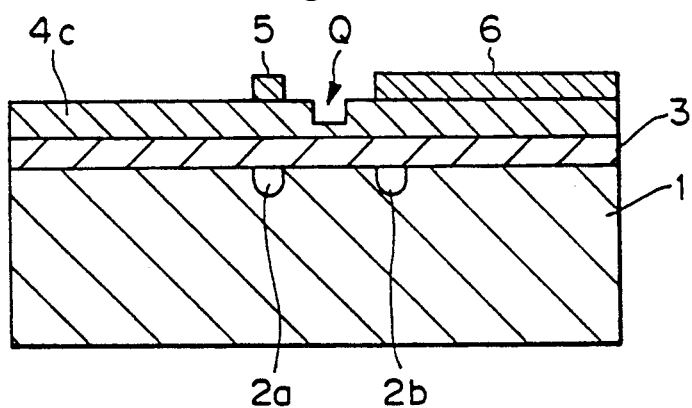
FIG. 10 is a sectional view showing a second modification of the embodiment shown in FIGS. 8A and 8B.

FIG. 10 shows a structure of a second modification.

In the present example, in place of the separated semiconductive layers 4a, 4b shown in FIGS. 8A and 8B, a semiconductive layer 4c comprised of silicon (Si) is formed between the buffer layer 3 and the electrodes 5 and 6 and all over the buffer layer 3. The semiconductive layer 4c has a thinly formed portion Q in the center of the corresponding region thereof between the electrodes 5 and 6. By this structure, a DC component or a low frequency component of the voltage applied across the electrodes 5, 6 is concentrated on the thinly formed portion Q and thus it is possible to gain the same effect as in FIGS. 8A and 8B.

Figure 11:
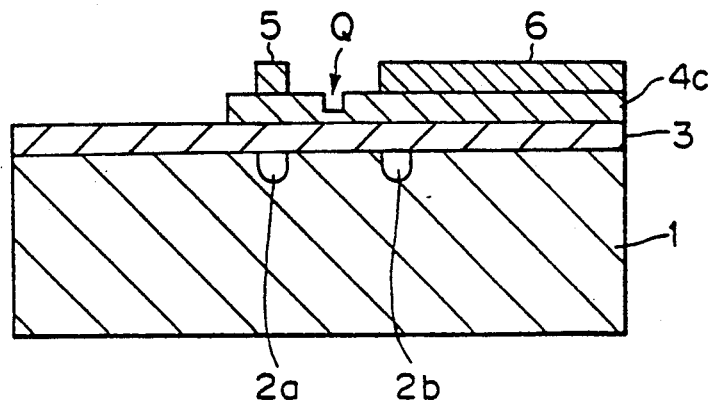
FIG. 11 is a sectional view showing a third modification of the embodiment shown in FIGS. 8A and 8B.

FIG. 11 shows a structure of a third modification, which is a combination of the example of FIG. 9 and the example of FIG. 10.

In the present example, since the semiconductive layer 4c is formed only in the vicinity of the electrode for signal line 5, it is possible to realize a better frequency characteristics as in the example of FIG. 9.

Figure 12:
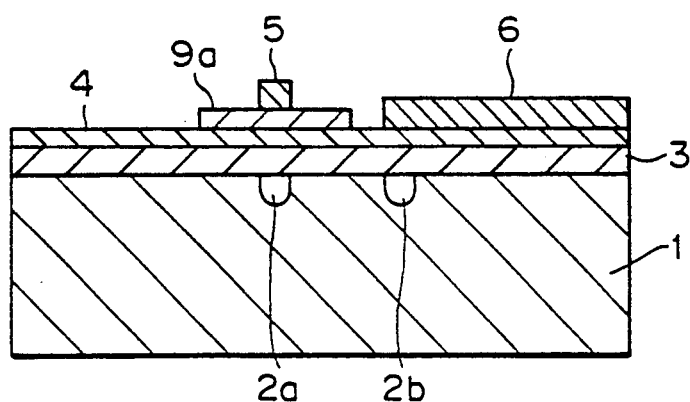
FIG. 12 is a sectional view showing a fourth modification of the embodiment shown in FIGS. 8A and 8B.

FIG. 12 shows a structure of a fourth modification.

In the present example, a semiconductive layer 4 and a second semiconductive layer 9a are provided in place of the separated semiconductive layers 4a, 4b shown in FIGS. 8A and 8B. The semiconductive layer 4 is comprised of silicon (Si) and formed between the buffer layer 3 and the electrode 6 and all over the buffer layer 3. The semiconductive layer 9a is comprised of silicon (Si) and formed between the semiconductive layer 4 and the electrode 5. Also, the semiconductive layer 9a has a specific resistance different from that of the semiconductive layer 4 and has a broader width than that of the corresponding electrode 5.

In the device using the asymmetrical electrodes 5, 6 for a traveling wave, the electric field in the vicinity of the optical waveguide 2b beneath the electrode for grounding 6 is relatively weak. Therefore, even if a DC electric field is concentrated on the region between the electrodes 5 and 6, it is possible to suppress the influence exerted on the refractive index of the optical waveguide 2b beneath the electrode 6 and thus gain the same effect as above.

Figure 13:
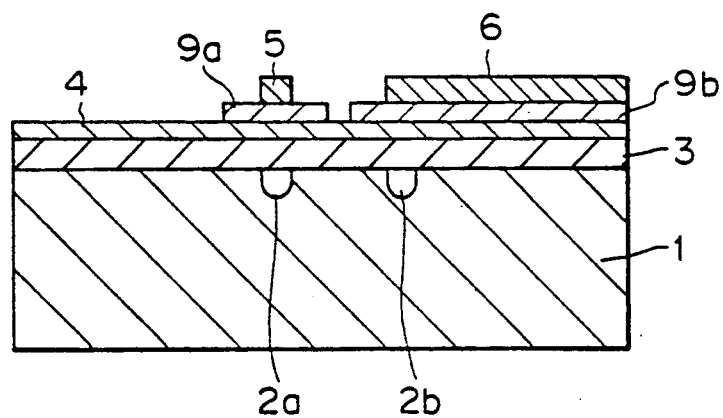
FIG. 13 is a sectional view showing a fifth modification of the embodiment shown in FIGS. 8A and 8B.

FIG. 13 shows a structure of a fifth modification, which is an improvement of the example of FIG. 12.

In the present example, a semiconductive layer 9b comprised of silicon (Si) is added to the structure shown in FIG. 12. The semiconductive layer 9b is formed between the semiconductive layer 4 and the electrode 6. Also, the semiconductive layer 9b has a specific resistance different from that of the semiconductive layer 4, 9a and has a broader width than that of the corresponding electrode 6. Since the present device has a number of designing parameters, it is possible to design and optimize the device more effectively and thus gain a better effect.

Although, in the above embodiments and the associated modifications, the explanation is given by way of the Mach-Zehnder type modulator, the present invention is applicable to other optical waveguide devices such as optical switches, or the like. Also, the present invention can be applied to an optical waveguide device to which a low frequency signal and a high frequency signal are fed independently.

Although the present invention has been disclosed and described by way of three embodiments and the associated modifications, it is apparent to those skilled in the art that other embodiments and modifications of the present invention are possible without departing from the spirit or essential features thereof.

We claim:

1. An optical waveguide device comprising:
    an optical waveguide formed on a surface of a substrate having an electro-optical effect;
    a pair of electrodes formed on a corresponding region above the optical waveguide and receiving a driving electric signal thereacross;
    a third electrode formed on a corresponding region above the substrate, wherein a distribution of an electric field occurring in a vicinity of the optical waveguide by an application of the electric signal is greatly changed in accordance with a change in a frequency of the electric signal, wherein the third electrode is comprised of a semiconductive layer and is disposed on the region spaced with a predetermined distance from the pair of electrodes formed on the corresponding regions above the optical waveguide and is coupled to receive a direct current voltage or a low frequency voltage;
    a buffer layer formed all over the substrate including the optical waveguide; and
    a primary semiconductive layer formed between the buffer layer and the pair of electrodes and third electrode and all over the buffer layer, wherein the third electrode has a specific resistance different from that of the primary semiconductive layer.

2. An optical waveguide device as set forth in claim 1, further comprising a secondary semiconductive layer formed between the primary semiconductive layer and the third electrode, the secondary semiconductive layer having a broader width than that of the third electrode and being disposed on a region spaced with a predetermined distance from the pair of electrodes.

3. An optical waveguide device as set forth in claim 1, further comprising a secondary semiconductive layer formed between the primary semiconductive layer and the pair of electrodes and third electrode, the secondary semiconductive layer having a broader width than that of each electrode and being separated in corresponding regions thereof between each electrode.

4. An optical waveguide device as set forth in claim 1, wherein the third electrode is disposed on a region spaced from the pair of electrodes with a sufficient distance such that the presence thereof does not have a substantial influence on a characteristic impedance of the optical waveguide, and wherein the third electrode is grounded.

5. An optical waveguide device comprising:
    an optical waveguide formed on a surface of a substrate having an electrooptical effect;
    a pair of electrodes formed on corresponding regions above the optical waveguide and receiving a driving electric signal thereacross;
    a buffer layer formed all over the substrate including the optical waveguide;
    a semiconductive layer formed between the buffer layer and the pair of electrodes, the semiconductive layer being separated in a corresponding region thereof between the pair of electrodes, each separated region having a broader width than that of the corresponding electrode,
    wherein, when a low frequency electric signal is applied to the pair of electrodes, an electric field is concentrated on the separated portion of the semiconductive layer and wherein a distribution of the electric field occurring in a vicinity of the optical waveguide by an application of the electric signal is greatly changed in accordance with a change in a frequency of the electric signal.

6. An optical waveguide device as set forth in claim 5, wherein the separated region of the semiconductive layer corresponding to an electrode for signal line of the pair of electrodes is formed only in the vicinity of the electrode for signal line.

7. An optical waveguide device comprising:
    an optical waveguide formed on a surface of a substrate having an electrooptical effect;

a pair of electrodes formed on corresponding regions above the optical waveguide and receiving a driving electric signal thereacross;

a buffer layer formed all over the substrate including the optical waveguide;

a semiconductive layer formed between the buffer layer and the pair of electrodes and all over the buffer layer, the semiconductive layer having a thinly formed portion in a corresponding region thereof between the pair of electrodes, wherein, when a low frequency electric signal is applied to the pair of electrodes, a greater part of a voltage drop caused by the application of the electric signal is applied to the thinly formed portion of the semiconductive layer and thus an electric field is concentrated on the thinly formed portion and wherein a distribution of the electric field occurring in a vicinity of the optical waveguide by an application of the electric signal is greatly changed in accordance with a change in a frequency of the electric signal.

8. An optical waveguide device as set forth in claim 7, wherein the semiconductive layer including the thinly formed portion is formed only in the vicinity of the pair of electrodes.

9. An optical waveguide device comprising:

an optical waveguide formed on a surface of a substrate having an electrooptical effect;

a pair of electrodes formed on corresponding regions above the optical waveguide and receiving a driving electric signal thereacross;

a buffer layer formed all over the substrate including the optical waveguide;

a first semiconductive layer formed all over the buffer layer;

a second semiconductive layer formed between the first semiconductive layer and an electrode for signal lines of the pair of electrodes, the second semiconductive layer having a specific resistance different from that of the first semiconductive layer and having a broader width than that of the electrode for the signal lines and wherein a distribution of an electric field occurring in a vicinity of the optical waveguide by an application of the electric signal is greatly changed in accordance with a change in a frequency of the electric signal.

10. An optical waveguide device comprising:

an optical waveguide formed on a surface of a substrate having an electrooptical effect;

a pair of electrodes formed on corresponding regions above the optical waveguide and receiving a driving electric signal thereacross;

a buffer layer formed all over the substrate including the optical waveguide;

a first semiconductive layer formed all over the buffer layer;

a second semiconductive layer formed between the first semiconductive layer and the pair of electrodes, the second semiconductive layer being separated in a corresponding region thereof between the pair of electrodes and having a specific resistance between from that of the first semiconductive layer, each separated region having a broader width than that of the corresponding electrode and wherein a distribution of an electric field occurring in a vicinity of the optical waveguide by an application of the electric signal is greatly changed in accordance with a change in a frequency of the electric signal.

11. An optical waveguide device as set forth in any one of claims 1, 5, 7, 9 or 10, wherein the buffer layer is comprised of dielectric material and has a smaller refractive index than that of the optical waveguide.

12. An optical waveguide device as set forth in claim 11, wherein the dielectric material is comprised of silicon dioxide.

13. An optical waveguide device as set forth in any one of claims 1, 5, 7, 9 or 10 wherein each recited semiconductive layer is comprised of silicon.

* * * * *

UNITED STATES PATENT AND TRADEMARK OFFICE
CERTIFICATE OF CORRECTION

PATENT NO. : 5,214,724
DATED : May 25, 1993
INVENTOR(S) : SEINO et al.

It is certified that error appears in the above-indentified patent and that said Letters Patent is hereby corrected as shown below:

On title page, item
   [57] ABSTRACT, line 12, change "of" to --or--.

Col. 9, line 58, change "effective" to --effectively--.

Signed and Sealed this

Fourteenth Day of June, 1994

Attest:

BRUCE LEHMAN

Attesting Officer         Commissioner of Patents and Trademarks